United States Patent [19]

Tsuchie

[11] Patent Number: 4,595,213
[45] Date of Patent: Jun. 17, 1986

[54] AUXILIARY WHEEL ARRANGEMENT OF BICYCLE

[76] Inventor: Kimihiro Tsuchie, 35-1 Kinugasa, Tenjinmori-cho, Kita-ku, Kyoto, Japan

[21] Appl. No.: 592,586

[22] Filed: Mar. 23, 1984

[30] Foreign Application Priority Data

May 28, 1983 [JP] Japan .............................. 58-80614[U]

[51] Int. Cl.⁴ .............................................. B62H 1/00
[52] U.S. Cl. ..................................................... 280/293
[58] Field of Search ................................. 280/293, 296

[56] References Cited

U.S. PATENT DOCUMENTS

| Re. 18,424 | 4/1932 | Hess | 280/293 |
|---|---|---|---|
| 2,391,982 | 1/1946 | Kutil | 280/293 |
| 2,450,979 | 10/1948 | Moller | 280/293 |
| 2,793,877 | 5/1957 | Meier | 280/293 |
| 4,203,500 | 5/1980 | Kamiya | 280/293 X |

FOREIGN PATENT DOCUMENTS

| 358096 | 11/1920 | Fed. Rep. of Germany | 280/293 |
|---|---|---|---|
| 378263 | 6/1936 | Fed. Rep. of Germany | 280/293 |
| 2097 | of 1912 | United Kingdom | 280/293 |
| 265490 | 2/1927 | United Kingdom | 280/293 |

Primary Examiner—John A. Pekar
Attorney, Agent, or Firm—Koda and Androlia

[57] ABSTRACT

The auxiliary wheel arrangement of bicycle of this invention comprises arms extending sideways from the bicycle body to be vertically displaceable, a means for imparting to the arms a torque required for lowering the tips of these arms and auxiliary wheels attached to the tips of the arms, and is used attached to e.g. the rear wheel of a bicycle on both sides thereof. A bicycle equipped with the auxiliary wheel arrangement of the present invention, which can have its body swayed in either lateral direction, is prevented from tilting of the body when it is parked or stopped, being thus kept upright then without fail.

11 Claims, 10 Drawing Figures

FIG.1(a)
FIG.1(b)
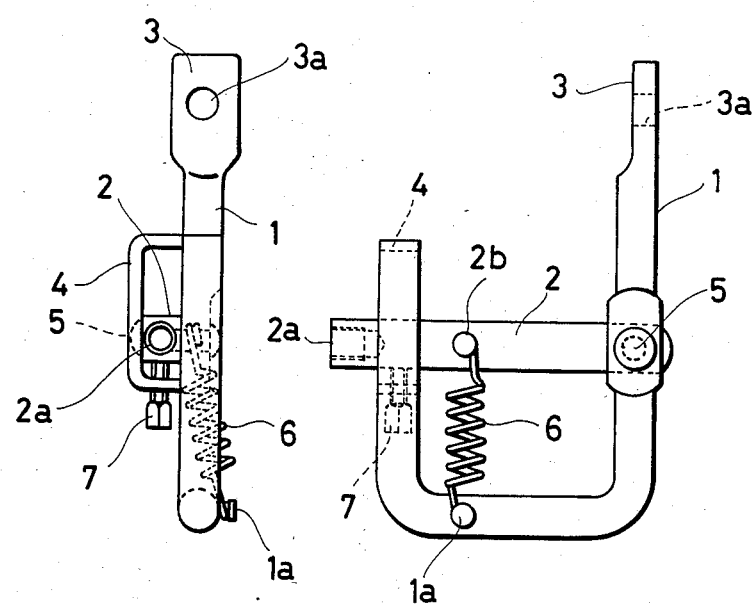
FIG.2
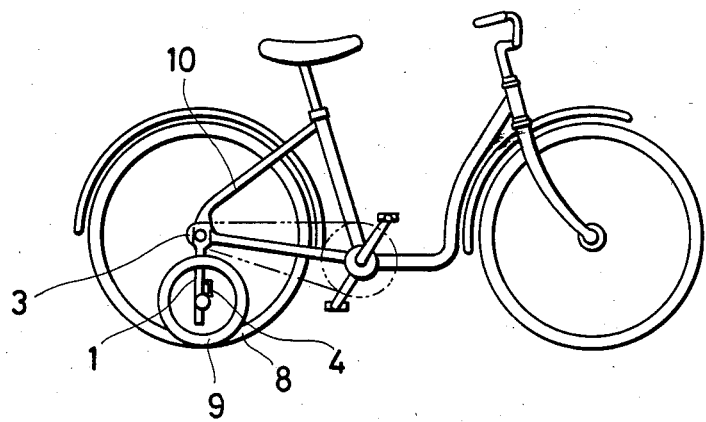

AUXILIARY WHEEL ARRANGEMENT OF BICYCLE

BACKGROUND OF THE INVENTION

1. Field of the Invention

The present invention relates to an auxiliary wheel arrangement of a bicycle.

2. Prior Art

Hitherto the auxiliary wheel arrangement of a bicycle intended for preventing its falling used to be fixedly attached to both sides thereof, e.g. its rear wheel, extending sideways. Hence, the bicycle equipped with such a prior art auxiliary wheel arrangement could not have its body swayed even in making a sharp turn to restore balance against the centrifugal force then acting on the bicycle body, this resulting in even an increased risk of falling or making it difficult to ride, and, therefore, the use for such prior art auxiliary wheel arrangements has been narrowly limited to e.g. bicycles for children.

SUMMARY OF THE INVENTION

In view of the above-mentioned shortcomings of the prior art counterparts, it is the object of the present invention to provide an auxiliary wheel arrangement for bicycle more practically useful allowing swaying of the bicycle body during cycling freely as it is necessary to restore balance, while it is capable of keeping the bicycle upright when it is parked or stopped with no risk of falling, i.e. if the rise does not have his feet on the ground.

In order to accomplish the above object, the auxiliary wheel arrangement of this invention comprises arms extending sideways from the bicycle body to be vertically displaceable, a means for imparting to the arms a torque required for lowering the tips of these arms and auxiliary wheels attached to the tips of the arms. This construction ensures against sideway skidding of the auxiliary wheels during parking or stopping and resultant inclination of the bicycle body, but during cycling the turning auxiliary wheels become easier to skid and either thereof is displaced upward while skidding sideways as necessary.

BRIEF DESCRIPTION OF THE DRAWINGS

A number of embodiments of the present invention are described below with reference being made to the accompanying drawings, in which:

FIGS. 1 (*a*) and (*b*) are a side view and a front view of an embodiment of the present invention respectively (auxiliary wheels not shown);

FIG. 2 is a side view of a bicycle equipped with an auxiliary wheel arrangement of the invention;

DETAILED DESCRIPTION OF THE INVENTION

Figure 3:
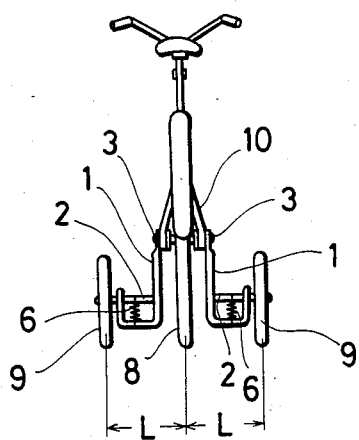
FIG. 3 is a rear view of the bicycle equipped with the auxiliary wheel arrangement of the invention.

Referring to FIGS. 1, numeral 1 denotes a supporting member and 2 an arm. The supporting member 1 consists essentially of a long bar or pipe bent in a "J"-shape with one end thereof flattened and a bolt hole 3*a* provided therein and the other end thereof provided with a narrow vertical guide frame 4. The arm 2 is made of a square bar pivoted at one end on the supporting member 1 with a pin 5 close to a point 3 at which the supporting member 1 is secured to the bicycle body. The other free or forward end portion of the arm 2 is set through the guide frame 4 to be held substantially level thereby and the forward end face is provided with a tapped hole 2*a* for attachment by bolting of an auxiliary wheel.

In the bottom section of the supporting member 1 there is provided a projection 1*a* and another projection 2*b* is provided at the corresponding point of the arm 2 near its center, and between the projections 1*a* and 2*b* a coil spring 6 is set stretched with a pulling urge, by which the arm 2 is imparted with a downward torque. Through the bottom of the guide frame 4 from under there is provided an adjusting bolt 7, which is used to set the extent of the arm 2's downward rotation (displacement).

Figure 4:
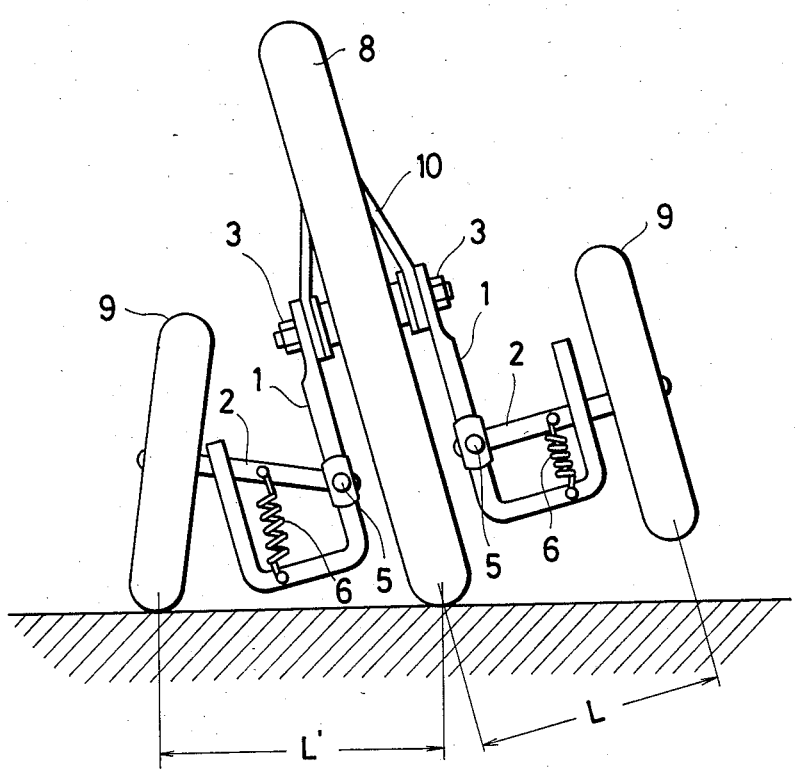
FIG. 4 is a rear view of the principal portion of the auxiliary wheel arrangement of the invention during cycling.

It is so arranged that the supporting member 1 is secured to the bicycle body by setting it on the rear axle of bicycle with it through the bolt hole 3*a* at the mounting point 3 and setting and screwing up a nut on the threaded end of the rear axle. Normally 2 sets of auxiliary wheel arrangement are attached to the bicycle body as a pair on both sides thereof as illustrated in FIGS. 2 through 4. It is, however, as well possible to use one set thereof attached to either side of the bicycle body. In these figures numeral 8 denotes a rear wheel of bicycle, 9 an auxiliary wheel attached to the tip of the arm 2 and 10 the bicycle body. The height of the auxiliary wheel 9 attached with respect to that of the rear wheel 8 is so adjusted with the adjusting bolt 7 that, when the bicycle body 10 is lifted upright, i.e. not inclined, the treading level of the auxiliary wheel 9 is lower than that of the rear wheel 8. Hence, as the bicycle body is lowered, the auxiliary wheel 9 comes into contact with the ground first.

When a bicycle is being cycled straight forward or when it is parked or stopped, the distance L between the treading levels of the rear wheel 8 and the auxiliary wheel 9 is equal on both sides as illustrated in FIG. 3. When the bicycle body 10 is inclined e.g. toward the left as shown in FIG. 4, however, the said distance is increased on the left side to become L'. For the distance or gap in treading level to be thus increased, the rear wheel 8 has to be skid rightwardly and the auxiliary wheel 9 leftwardly. When the bicycle is parked or stopped, however, this sideway skidding is prevented by the increased frictional resistance between tire and ground, hence the posture of the bicycle body 10 as it is stopped is retained without fail, and the rider can (even) wait with both feet on the pedals ready for resuming cycling. When the wheels are rotating during cycling, on the other hand, the frictional resistance between tire and ground is reduced with resultant ease of side skidding, hence the gap in treading level is readily increased for the bicycle body 10 to be freely swayable.

For the above reason, it is preferable to use as the tire for the auxiliary wheel 9 of the invention one with a high friction coefficient, e.g. a pneumatic rubber tire which is known to have a high frictional resistance against the ground. The coil spring 6 is for increasing the frictional resistance of the auxiliary wheel 9 by imparting a downward torque to the arm 2. It is, however, important to select the resiliency of this spring properly, for if it is too high, the bicycle body 10 is difficult to sway and in an extreme case the rear wheel 8 is lifted from the ground.

By the way, a road is generally supposed to be high at the center and gently sloped toward both edges, but even on such a road sloped sideways both auxiliary wheels 9 of the invention are kept in contact with the ground, keeping the bicycle body 10 upright.

Figure 5A:
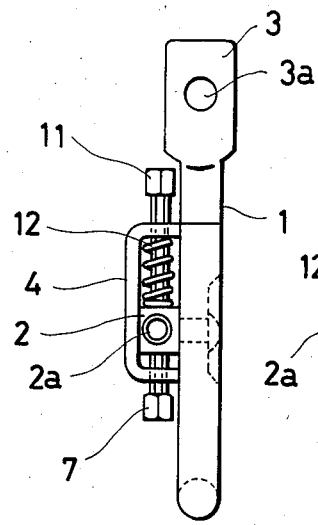
FIG. 5 (*a*) and (*b*) are a side view and a front view of another embodiment of the present invention respectively (auxiliary wheels not shown)
Figure 5B:
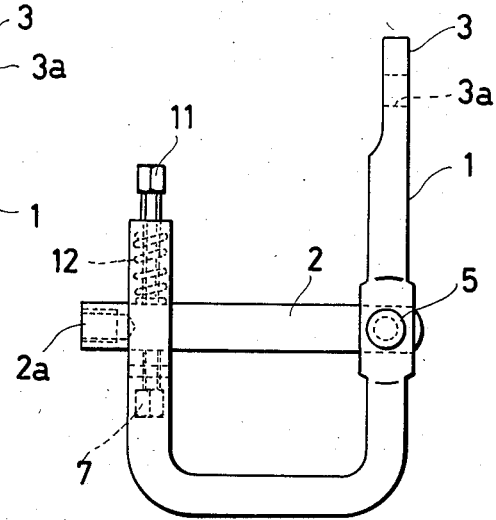

Thus, a bicycle freely swayable while being cycled is convenient for ordinary cyclists, but it cannot necessary be so for those unable to ride, those still trying to acquire the skill or those who want to cycle slowly because of the increased difficult to retain balance. Shown in FIG. 5 is an embodiment suited in such cases, in which an adjusting bolt 11 is disposed above the guide frame 4 for limiting the extent of upward displacement of the arm 2. By this the inclination of the bicycle body 10 is limited for elimination of the above inconvenience, with possibility of increasing the extent of displacement as one skills in cycling so that the bicycle body can be swayed increasingly. In this embodiment a coil spring 12 is set compressed between the upper section of the guide frame 4 and the arm 2 for the latter to be imparted with a downward torque.

By the way, in the above-described embodiments a pulling spring or compression spring is used as a means of imparting a downward torque to the arm, it is invariably aimed at increasing the treading frictional resistance of the auxiliary wheel, hence it can be dispensed with depending on other conditions. So, it is feasible, for instance, when the weight of the auxiliary wheel is increased and it is fitted with a tire of increased friction coefficient.

Figure 6:
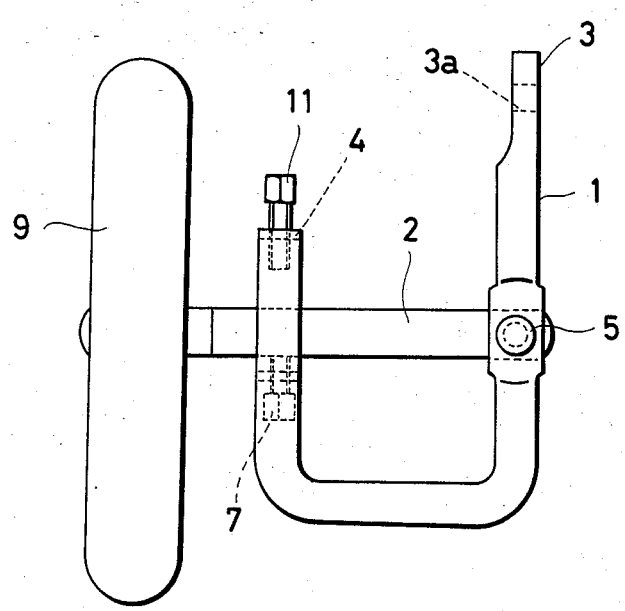
FIG. 6 is a front view of still another embodiment.

The embodiment shown in FIG. 6 is without the coil spring 6 of FIG. 1, or the coil spring 12 of FIG. 5, in which the downward torque in question is imparted to the arm 2 by the dead weight of the auxiliary wheel 9 fitted with a tire of increased friction coefficient.

If the spring can thus be dispensed with, it is advantageous not only in that the integral number of parts is reduced but also in that the absence of the resilience of the spring can simulate the feeling of cycling without auxiliary wheels, a bicycle with such auxiliary wheels being easier to ride.

Attachment of the auxiliary wheel arrangement of the present invention to the bicycle body may be feasible not only by the use of the bicycle's rear axle but also by bolting or welding its supporting member to a proper point of the bicycle body, and it is even possible to secure the arm direct to the bicycle body. In the last-mentioned case part of the bicycle body is to be regarded as the supporting member.

Figure 7A:
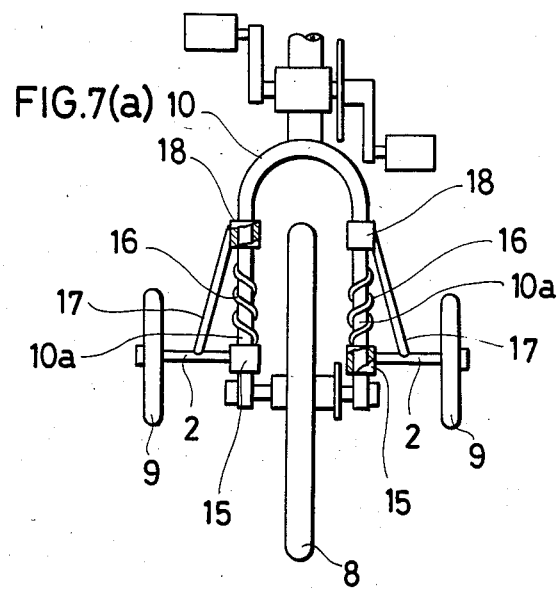
FIG. 7 (*a*) and (*b*) are a partially cut-away plan view and a partially cut-away rear view of the principal portion of a further embodiment.
Figure 7B:
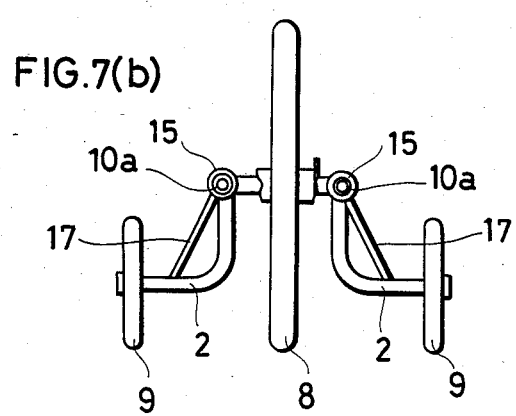

Shown in FIGS. 7 (a) and (b) is an embodiment, in which, as mentioned above, the arm is directly secured to the bicycle body, a short pipe as mounting aid 15 is connected to one end of the arm 2, this short pipe is set on the fork 10a of the bicycle body 10 and secured in place to be rotatable. Numeral 16 denotes a spring with one end thereof fixed to the mounting aid 15 and the other end fixed to a proper point of the fork 10a and this spring 16 serves to impart the required downward torque to the arm 2. Numeral 17 denotes an auxiliary stay for ensuring against longitudinal displacement of the arm 2, having one end thereof fixed to the arm 2 and the other end fixed to another short-pipe mounting aid 18, which is set on the fork 10a a given distance away from the above-mentioned mounting aid 15.

The auxiliary wheel arrangement of this invention is applicable not only to a bicycle but also to a motorcycle.

As will be apparent from the above description, the auxiliary wheel arrangement of the present invention enables swaying of the bicycle body during cycling as necessary, ensuring against falling of the bicycle body during parking or stopping, hence, being useful for children or adults who cannot ride bicycle, cyclists who prefer slow and leisurely cycling, aged and handicapped persons et. al., it is strikingly different from any prior art counterpart.

What is claimed is:

1. An auxiliary wheel arrangement for bicycle comprising:
   an arm extending to one side from a bicycle body adjacent a rear wheel of said bicycle to be vertically displaceable;
   a means for imparting a pivotal displacement to said arm for lowering the tip thereof; and
   an auxiliary wheel attached to the tip of said arm, said auxiliary wheel having a static frictional resistance against the ground which prevents sliding of the auxiliary wheel relative to the ground in a direction transverse to said bicycle when said bicycle is stationary and having a rolling frictional resistance against the ground which allow sliding of said auxiliary wheel relative to the ground in a direction transverse to said bicycle when said bicycle is moving.

2. An auxiliary wheel arrangement for bicycle as recited in claim 1, wherein there are further provided a supporting member with means for mounting to the bicycle body and said arm is pivoted on said supporting member to be vertically displaceable.

3. An auxiliary wheel arrangement for bicycle as recited in claim 2, wherein a pivotal displacement is imparted to said arm by means of a spring provided between said supporting member and said arm.

4. An auxiliary wheel arrangement for bicycle as recited in claim 3, wherein impartation of said pivotal displacement to said arm is done by means of a coil spring used as pulling spring.

5. An auxiliary wheel arrangement for bicycle as recited in claim 4, wherein said supporting member is substantially "J"-shaped has provided at one end thereof a means for securing it to the bicycle body and a narrow and long vertical guide frame at the other end, one end of said arm is pivoted on said supporting member close to said securing means and the other, outer end portion thereof is inserted into said guide frame for said arm to be held substantially level, there is set said coil spring stretched between a low point of said supporting member and said arm and there is provided an adjusting bolt under said guide frame for limiting the extent of the downward rotation (displacement) of said arm.

6. An auxiliary wheel arrangement for bicycle as recited in claim 3, wherein impartation of said pivotal displacement to said arm is done by means of said coil spring used as compression spring.

7. An auxiliary wheel arrangement for bicycle as recited in claim 6, wherein said supporting member is substantially "J"-shaped has provided at one end thereof a means for securing it to the bicycle body and a narrow and long vertical guide frame at the other end, one end of said arm is pivoted on said supporting member close to said securing means and the other, outer end portion thereof is inserted into said guide frame for said arm to be held substantially level, there is set said coil spring compressed between a high point of said guide frame and said arm and there are provided adjusting bolts above and below said guide frame for limiting the extents of upward and downward rotation.

8. An auxiliary wheel arrangement for bicycle as recited in claim 2, wherein the dead weight of said auxiliary wheel is used to impart said pivotal displacement to said arm.

9. An auxiliary wheel arrangement for bicycle as recited in claim 2, wherein under said arm and on said support member there is provided an adjusting bolt for limiting the extent of downward rotation thereof.

10. An auxiliary wheel arrangement for bicycle as recited in claim 2, wherein above said arm and on said support member there is provided an adjusting bolt for limiting the extent of upward displacement thereof.

11. An auxiliary wheel arrangement for bicycle as recited in claim 1, wherein one end of said arm is displaceably and directly attached to the bicycle body.

* * * * *